US012804104B2

(12) United States Patent
Adcock et al.

(10) Patent No.: US 12,804,104 B2
(45) Date of Patent: Nov. 17, 2026

(54) CONFERENCE SYSTEM FOR USE OF MULTIPLE DEVICES

(71) Applicant: Capital One Services, LLC, McLean, VA (US)

(72) Inventors: Lee Adcock, Midlothian, VA (US); Mehulkumar Jayantilal Garnara, Glen Allen, VA (US); Vamsi Kavuri, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 166 days.

(21) Appl. No.: 18/224,783

(22) Filed: Jul. 21, 2023

(65) Prior Publication Data

US 2025/0030815 A1 Jan. 23, 2025

(51) Int. Cl.

*H04N 7/15* (2006.01)
*G06F 3/01* (2006.01)
*H04N 7/14* (2006.01)

(52) U.S. Cl.

CPC ............. *H04N 7/152* (2013.01); *G06F 3/017* (2013.01); *H04N 7/147* (2013.01)

(58) Field of Classification Search

CPC ......... H04N 7/152; H04N 7/147; G06F 3/017
USPC ........................................................ 348/14.09
See application file for complete search history.

(56) References Cited

U.S. PATENT DOCUMENTS 1,138,128 A * 5/1915 Long ........................ E05F 1/063 16/312
8,593,501 B1 11/2013 Kjeldaas
10,582,159 B2 3/2020 Thakkar et al.
10,645,341 B1 5/2020 Noland
10,848,712 B1 11/2020 Rao
10,979,481 B2 4/2021 Jayaweera
11,100,548 B1 8/2021 Gray
11,228,624 B1 1/2022 Oueslati
11,381,628 B1 * 7/2022 Hesters ................... H04L 65/65
11,722,328 B2 8/2023 Frolovichev
11,777,754 B1 10/2023 Zhang
2003/0056220 A1 3/2003 Thornton
2005/0078172 A1 4/2005 Harville
2012/0127263 A1 5/2012 Ogle
2013/0176382 A1 7/2013 Fujino
2013/0342637 A1 12/2013 Felkai
2014/0064471 A1 3/2014 Krishnan
2014/0168345 A1 6/2014 Vernick
2015/0222615 A1 8/2015 Allain
(Continued)

FOREIGN PATENT DOCUMENTS

CN 116684146 A 9/2023
KR 20140030276 A 5/2012
(Continued)

*Primary Examiner* — Binh Kien Tieu

(74) *Attorney, Agent, or Firm* — Sterne, Kessler, Goldstein & Fox P.L.L.C.

(57) ABSTRACT

A conference system is described that associates at least one of a plurality of devices participating in a conference session with at least one of a plurality of users participating in the conference session, and gathers an audio/video input from the at least one of the plurality of devices. The conference system detects a designated user from the plurality of users by detecting an audio/video cue from the audio/video input, and modifies a setting of the conference session based on the designated user.

20 Claims, 10 Drawing Sheets

(56) References Cited

U.S. PATENT DOCUMENTS

| | | | | |
|---|---|---|---|---|
| 2015/0244699 | A1 | 8/2015 | Hessler | |
| 2016/0150184 | A1 | 5/2016 | Gandhi | |
| 2016/0227161 | A1 | 8/2016 | Jing et al. | |
| 2017/0171261 | A1 | 6/2017 | Smus | |
| 2020/0110572 | A1 | 4/2020 | Lenke | |
| 2020/0344278 | A1 | 10/2020 | Mackell | |
| 2021/0136127 | A1 | 5/2021 | Ghanaie-Sichanie | |
| 2021/0149496 | A1* | 5/2021 | Sen | G06T 7/20 |
| 2021/0303075 | A1* | 9/2021 | Cowburn | G06F 3/011 |
| 2021/0399911 | A1 | 12/2021 | Jorasch | |
| 2021/0400142 | A1 | 12/2021 | Jorasch | |
| 2022/0224735 | A1* | 7/2022 | Tokuchi | G06V 40/161 |
| 2023/0073828 | A1* | 3/2023 | Vendrow | H04L 65/403 |
| 2023/0139813 | A1 | 5/2023 | Thiel | |
| 2023/0319233 | A1* | 10/2023 | Sommerlade | G06V 40/103<br>348/14.16 |
| 2023/0410005 | A1 | 12/2023 | Gambhir | |
| 2024/0333864 | A1* | 10/2024 | Peterson | H04N 7/147 |

FOREIGN PATENT DOCUMENTS

| | | | |
|---|---|---|---|
| WO | 2014143060 | A1 | 9/2014 |
| WO | 2014180371 | A1 | 11/2014 |

* cited by examiner

CONFERENCE SYSTEM FOR USE OF MULTIPLE DEVICES

BACKGROUND

With the increasing demand for remote work, improving the user experience of online conferencing systems is becoming increasingly important. In particular, improving the user interface displayed to participants during a conference session is useful for improving the user experience.

BRIEF DESCRIPTION OF THE DRAWINGS/FIGURES

Embodiments of the present disclosure are described with reference to the accompanying drawings. In the drawings, like reference numbers indicate identical or functionally similar elements. Additionally, the leftmost digit(s) of a reference number identifies the drawing in which the reference number first appears. In the accompanying drawings.

Figure 1:
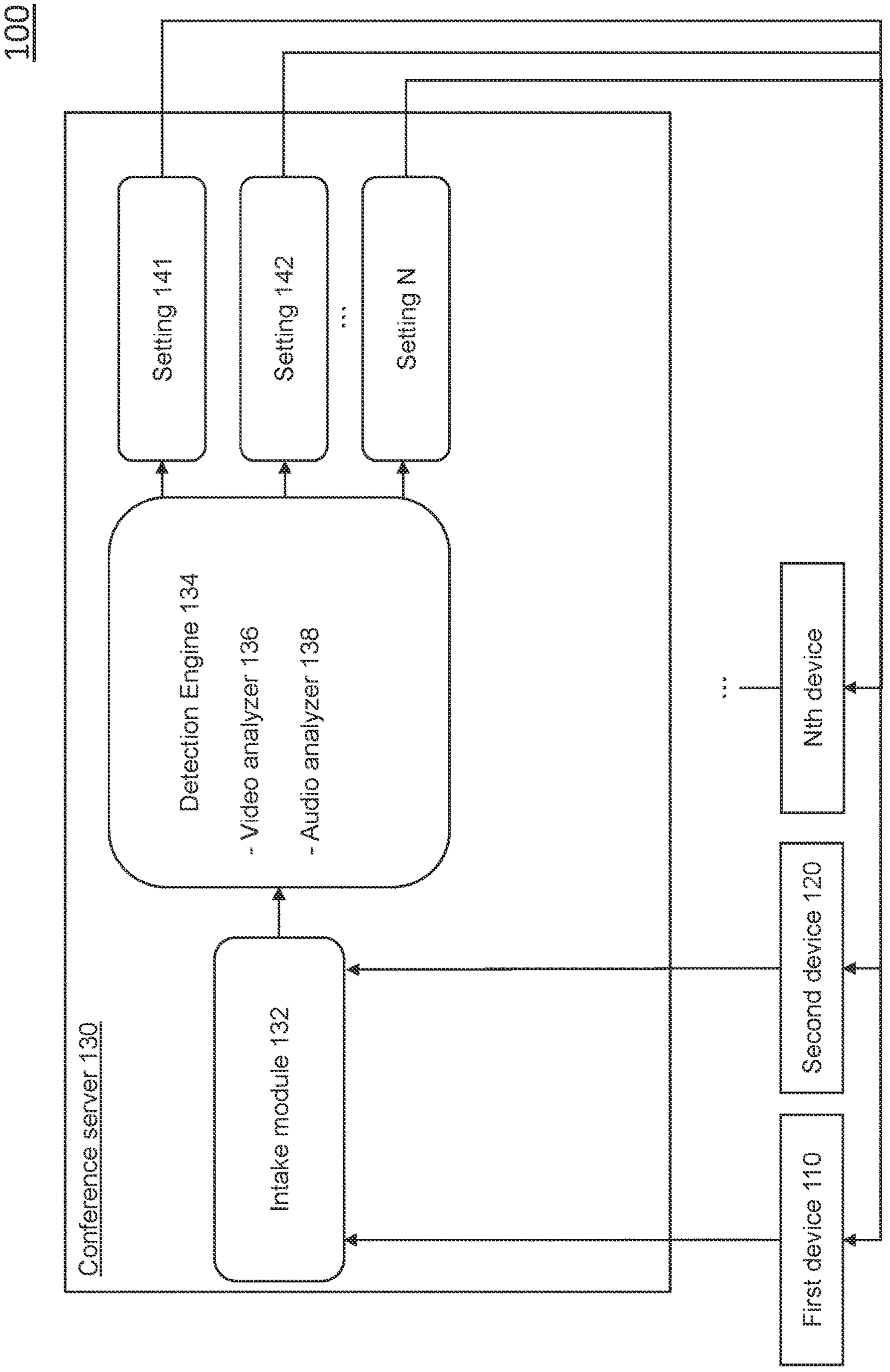
FIG. 1 illustrates a block diagram of an example of a conference system in an embodiment of the present disclosure.

Embodiments of the present disclosure will now be described with reference to the accompanying drawings.

DETAILED DESCRIPTION

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module," "engine," or "unit" referred to herein may include software, hardware, or a combination thereof in an embodiment of the present disclosure in accordance with the context in which the term is used. For example, the software may be machine code, firmware, embedded code, or application software. The software may include instructions stored on a non-transitory storage medium that, when executed by hardware, cause the hardware to perform functions in accordance with those instructions. The hardware may be circuitry, a processor, a special purpose computer, an integrated circuit, integrated circuit cores, a pressure sensor, an inertial sensor, a microelectromechanical system (MEMS), passive devices, or a combination thereof. Further, if a module, engine, or unit is written in the system or apparatus claims section below, the module, engine, or unit is deemed to include hardware circuitry for the purposes and the scope of the system or apparatus claims.

The modules, engines, or units in the following description of the embodiments may be coupled to one another as described or as shown. The coupling may be direct or indirect, without or with intervening items between coupled modules or units. The coupling may be by physical contact or by communication between modules or units.

System Overview and Function

FIG. 1 illustrates an example of a block diagram of the conference system in an embodiment of the present disclosure. A conference system 100 includes a first device 110, a second device 120, and a conference server 130. In some embodiments, the conference system 100 further includes additional devices in addition to the first device 110 and the second device 120. The number of devices is determined based on how many devices use the conference system 100. In some embodiments, the conference server 130 may be part of a backend computing infrastructure, including a server infrastructure of a company or institution. In some embodiments, the backend computing infrastructure may be implemented in a cloud computing environment. The cloud computing environment may be a public or private cloud service. A private cloud refers to a cloud infrastructure similar to a public cloud with the exception that it is operated solely for a single organization.

In some embodiments, a conference server 130 may be implemented with modules and sub-modules. For example, the conference server 130 may include an intake module 132, and a detection engine 134. In some embodiments, the intake module 132 may be coupled to the detection engine 134. The conference server 130 handles a conference session in which devices including a first device 110 and a second device 120 participate.

The intake module 132 enables the receipt of one or more audio/video (AV) inputs, from one or more remote devices including the first device 110 and the second device 120.

The detection engine 134 enables the parsing and analysis of the AV inputs. In some embodiments, the analytics includes a video analyzer 136 and an audio analyzer 138. The video analyzer 136 performs the video-related analysis of the processing performed by the conference server 130. The audio analyzer 138 performs the audio-related analysis of the processing performed by the conference server 130. In some embodiments, the detection engine 134 may be implemented with, or as a part of, a cloud computing service.

Based on the analytics, the detection engine 134 generates modified settings including a first modified setting 141 and a second modified setting 142. The conference server 130 sends the first modified setting 141 and the second modified setting 142 to the first device 110 and the second device 120, respectively. The first modified setting 141 and the second modified setting 142, alone or in combination, modify the settings of the conference session.

Operations of the Conference System-Participants Use Individual Devices

In some embodiments of this disclosure, the conference server 130 detects that one user has designated another user, and changes the conference settings based on that detection. There are several ways in which the user can designate other users. Here, the behavior of the conference system 100 when a user designates another user while logged in to a conference session using the respective device is explained.

Figure 2:
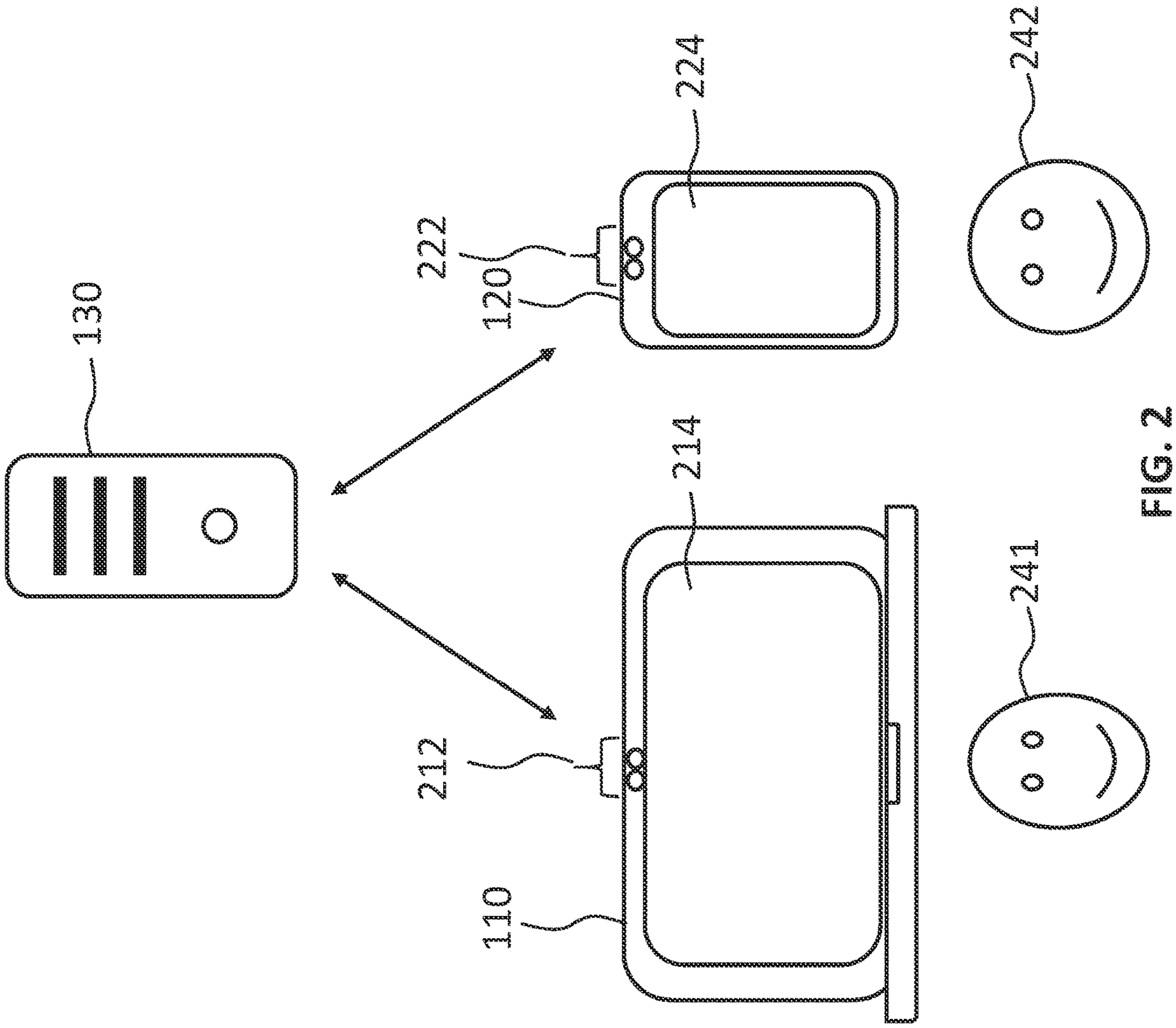
FIG. 2 illustrates an example of a conference system in an embodiment of the present disclosure.

FIG. 2 illustrates an example of a conference system in an embodiment of the present disclosure. A first user 241 uses the first device 110 and a second user 242 uses the second device 120 at the conference session. The first device 110 is, for example, a laptop computer having a sensing device 212 and a screen 214. The second device 120 is, for example, a tablet computer having a sensing device 222 and a screen 224. The sensing devices 212 and 222 are, for example, cameras and/or microphones. The first device 110 transmits an AV input signal sensed by the sensing device 212 as a first AV input to the conference server 130. The second device 120 transmits an AV signal sensed by the sensing device 222 as a second input to the conference server 130. The laptop computer and the tablet computer are merely examples of the first device 110 and the second device 120, respectively. The first and second electronic devices can be any electronic device that can be connected to the conference server 130. The first and second electronic devices may be, for example, smartphones, desktop computers, dedicated conference terminals, etc.

Figure 3:
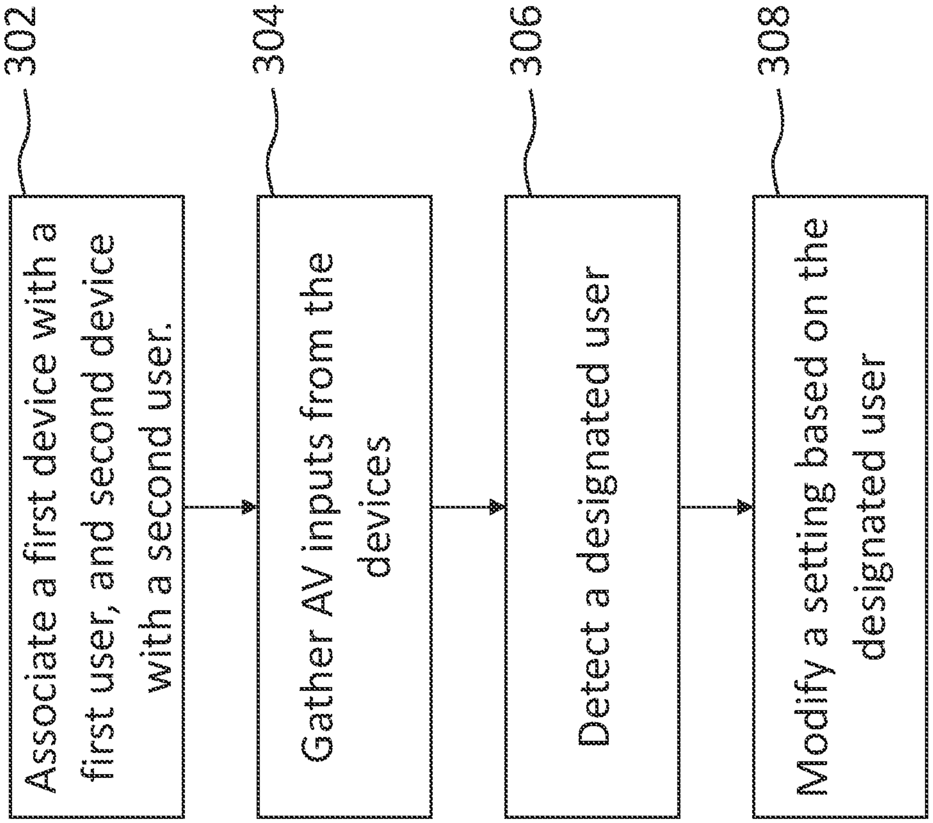
FIG. 3 illustrates a flowchart that describes an example of an overview operation of a conference system.

FIG. 3 illustrates a flowchart that describes an example of an overview operation of the conference system. In some embodiments, the operations described below are performed by functional elements of the conference server 130, such as the intake module 132, the detection engine 134, the video analyzer 136, and the audio analyzer 138, in cooperation with hardware elements such as a processor and memory. Henceforth, when the subject of the description of the operation is simply stated as the conference server 130, it means that one or more of the above-mentioned elements performs the operation.

At operation 302, a first device is associated with a first user, and a second device is associated with a second user. In an example, the conference server 130 associates the first device 110 with the first user 241, and the second device 120 with the second user 242. The first user of the first device 110 and the second user of the second device 120 may have each attempted to participate in the conference session by using an invitation letter or holding a conference session. In some embodiments, the conference server 130 may perform the association by associating user information entered by the user with the device the user used to enter the information. In some embodiments, the conference server 130 may identify users in the vicinity of the device from facial and/or audio input to the device participating in the conference session and associate the identified persons with the device. In some embodiments, in order to identify users in the vicinity of the device from the face and/or voice input, the conference server 130 may generate an AI model by machine learning to link user information with the user's face and/or voice based on the video and/or audio recordings of the conference sessions held and the input user information.

At operation 304, AV inputs are gathered from the devices. In an example, the conference server 130 gathers the first AV input from the first device 110 and the second AV input from the second device 120. In some embodiments, the conference server further gathers AV inputs from other devices participating in the conference session. In some embodiments, the conference server 130 gathers the AV inputs during an entire conference session or a specified time period indicated by the users. In some embodiments, the conference server 130 stores the gathered AV inputs and uses them for the machine learning to create the AI models.

At operation 306, a designated user (e.g., a second user referred to or indicated by a first user) is detected. In an example, the conference server 130 detects a designated user by detecting AV cues from the AV inputs. The AV cues may be, for example, AV frames or predetermined lengths of the AV data retrieved from the AV inputs. The AV cues may contain specific movements of the users or the voices of the users, which identifies who the user is. In some embodiments, the conference server 130 detects the AV cues by using AV feature detecting methods, pattern-matching methods, or any other AV processing methods. In some embodiments, at operation 306, the conference server 130 may identify a primary user from among the respective users. Details of operation 306 are described below, along with example use cases.

At operation 308, a setting of the conference session is modified based on the designated user. In an example, the conference server 130 modifies a setting of the conference session. Examples of various conference settings that may be modified are discussed in further detail below. Based on the results of the detection of the designated user in operation 306, the conference server 130 determines optimal conference settings and applies the conference settings to the conference session.

In some embodiments, the modification includes modifying a display method of the video input of the device associated with the designated user. In some embodiments, the modification includes setting the video input of the device associated with the designated user as a primary video of the conference session. In some embodiments, the modification includes modifying the display method of an attendee grid on an interface of the conference system. In the interface of the conference system, a predetermined area is assigned to a user as a user area respectively, and multiple user areas are displayed in a grid arrangement. The modification of the display method of the grid includes modification of the appearance of the user region of the designated user. In some embodiments, the modification includes highlighting the designated user on an interface of the conference system. In some embodiments, the modification includes pinning the user region of the designated user at a specific area of the grid for at least a predetermined period of time.

In some embodiments, operation 308 further includes identifying, as a designating user, the user associated with the device that output the AV cue that was a source for detecting the designated user. In some embodiments, operation 308 further includes determining the direction from the designating user to the designated user by detecting the AV cue from the AV input. In some embodiments, the modification includes placing the user region of the designated user at a display location relative to the user region of the designating user in a same direction as the determined direction. Since operation 308 has several variations in this disclosure, individual variations are further explained below.

Modification of the Setting—Switching a Primary User

Figure 4:
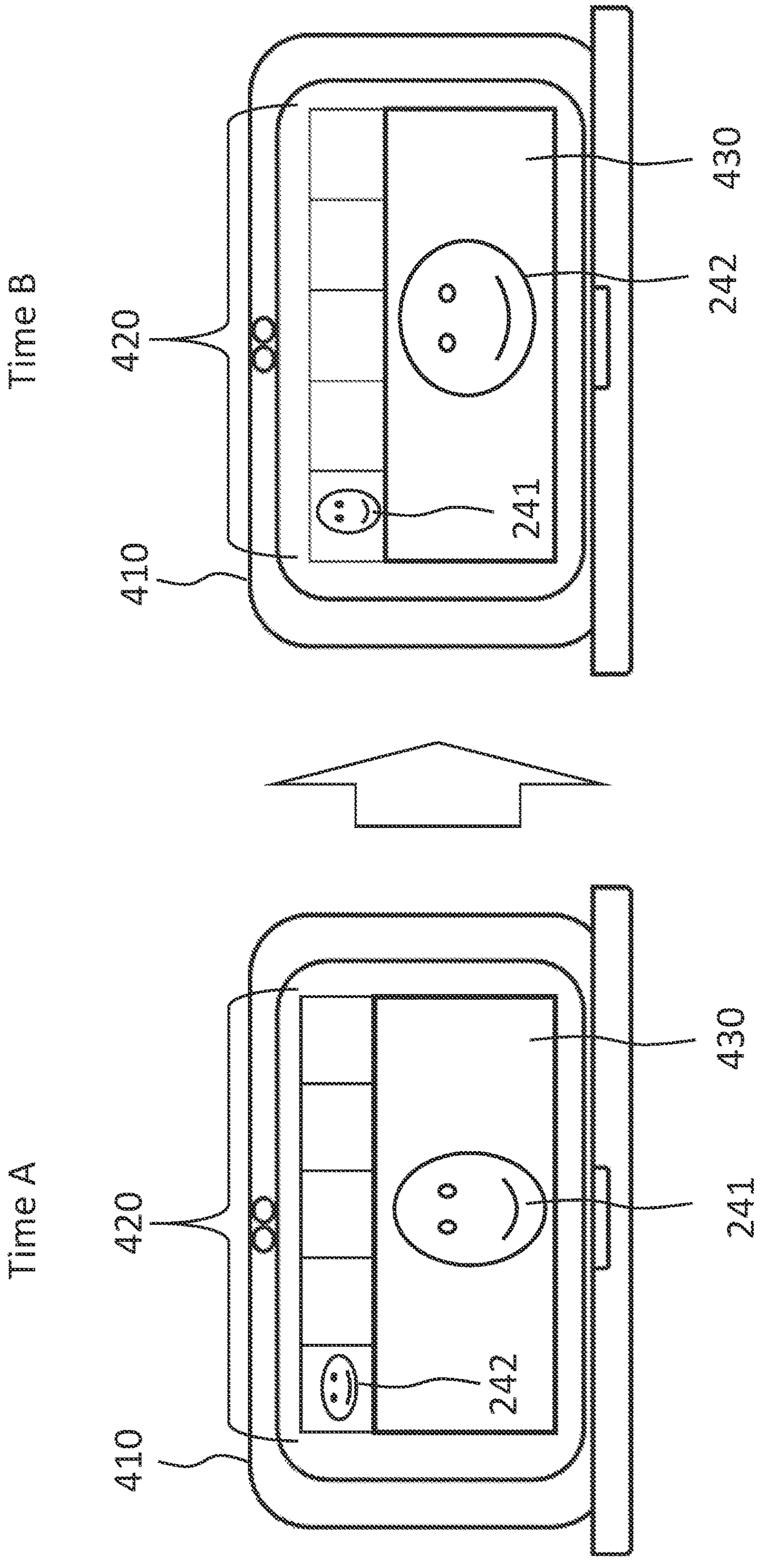
FIG. 4 illustrates an example of operation 308 of FIG. 3 in an embodiment of the present disclosure.

FIG. 4 illustrates an example of operation 308 of FIG. 3 in an embodiment of the present disclosure. A third device 410 is participating in the same conference session with the first device 110 and the second device 120. FIG. 4 illustrates a temporal transition from the conference display of the third device 410 at time A to an updated display of the third device 410 at time B. The conference display includes a grid 420 corresponding to participating users, and a primary display area 430. The grid 420 includes, in this example, five horizontal user regions to display the AV input corresponding to respective users participating in the conference session. In FIG. 4, illustrations of AV inputs other than the first AV input and the second AV input may be omitted for clarity of explanation.

In this example, as shown on the screen of the third device 410 at time A, one region of the grid 420 displays a face of the second user 242 by rendering the second AV input from the second device 120, which captures the face of the second user 242 by using the sensing device 222. The primary display area 430 displays a face of the first user 241 by rendering the first AV input from the first device 110 which captures the face of the first user 241 by using the sensing device 212.

The conference server 130 may display the first AV input at the primary display area 430 based on the conference settings. In some embodiments, the conference server 130 determines to display the AV input at the primary display area 430 based on the specific device which inputs the sound as the AV input. In some embodiments, the first user 241 or other users in the conference session determines which user's AV input to display at the primary display area 430.

If the conference server 130 detects a designated user from the AV cue of the first AV input while the first AV input is being displayed on the primary display area 430, the conference server 430 changes the AV input displayed on the primary display area 430 to the AV input from the device associated with the designated user. Third device 410 at time B in FIG. 4 illustrates that the AV input for the primary display area 430 is switched from the first AV input to the second AV input in response to the detection of the designated user, the second user 242, while the first AV input, corresponding to the first (designating) user 241 is relegated to a user region in the grid 420.

Detection of the designated user is performed by the conference server, for example, as follows. In some embodiments, the conference server 130 analyzes the voice signal of the AV input to detect the designated user. For example, if the first user 241 calls a name of the second user 242, the conference server 130 detects the user 242 as the designated user. In some embodiments, the names of users may be obtained from user names used in the conference session. In some embodiments, the names of users may be obtained by using a machine learning method applied to previous conference sessions. The machine learning method may identify the user's name by correlating the name called with the user information of other users who spoke immediately after the name. Thus, machine learning can be used to create AI models that can identify a user as a designated user even when the user is called by a nickname that differs from the user's name as registered with the conference system. In some embodiments, the conference server 130 may determine whether a user with a name has been designated or not by detecting not only the spoken name but also the context before and after it.

In some embodiments, the conference server 130 alternatively or additionally analyzes the video signal of the AV input to detect the designated user. For example, if the first user 241 calls a name of the second user 242 with a gesture designating another person (e.g., by using a hand) the conference server 130 detects the user 242 as the designated user.

As shown on the screen of the third device 410 at time B, the primary display area 430 displays a face of the second user 242 by rendering the first AV input from the second device 120, which captures the face of the second user 242 by using the sensing device 222. In some embodiments, as shown on the screen of the third device 410 at time B, the grid 420 displays a face of the first user 241 by rendering the first AV input from the first device 110, which captures the face of the first user 241 by using the sensing device 212.

In this way, the user experience is improved by detecting the presence of a user who is expected to speak during the conference session and switching the primary user to bring that user to attention.

Modification of the Setting—Pinning a designated User

Figure 5:
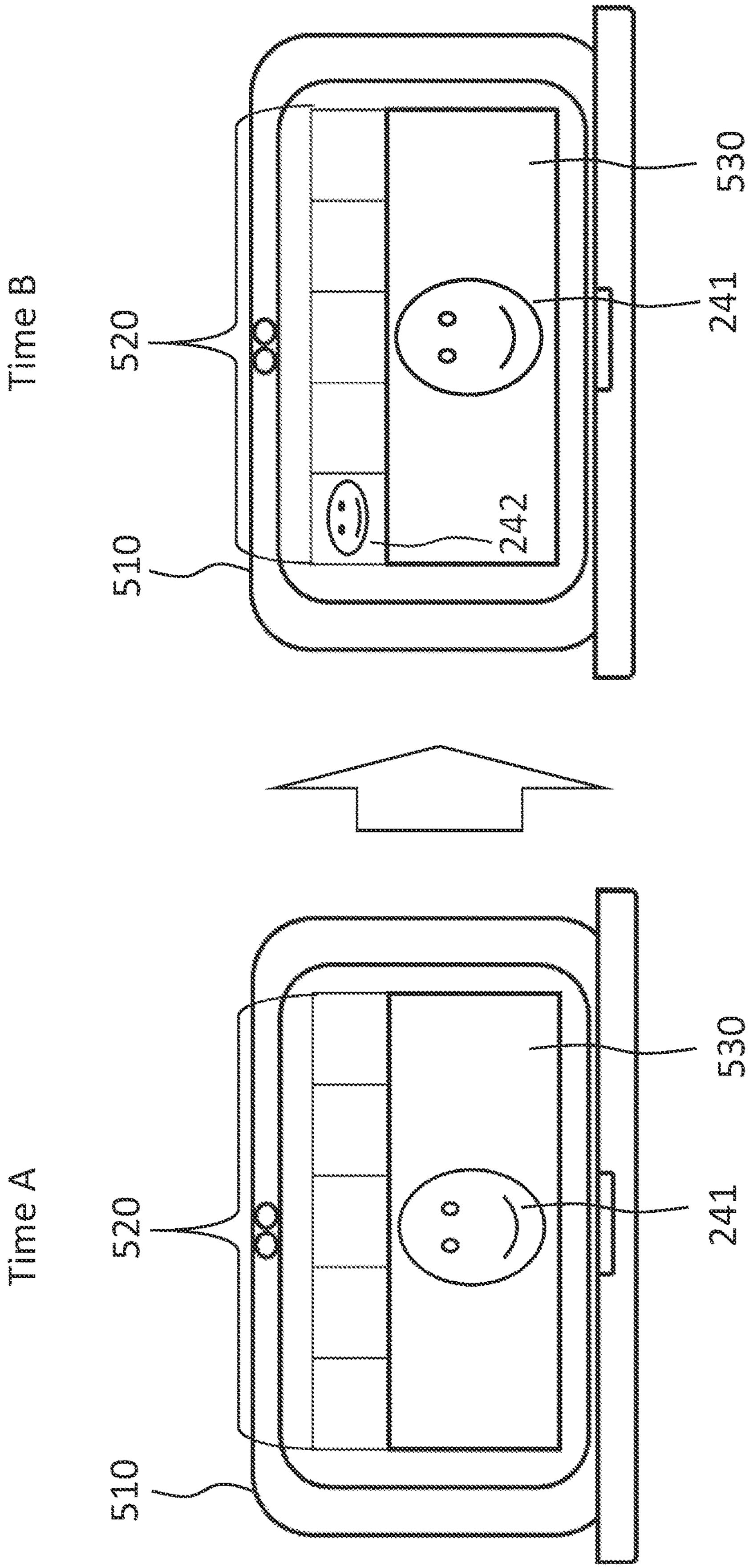
FIG. 5 illustrates an example of operation 308 of FIG. 3 in an embodiment of the present disclosure.

FIG. 5 illustrates an example of operation 308 of FIG. 3 in an embodiment of the present disclosure. A third device 510 is participating in the same conference session with the first device 110 and the second device 120. FIG. 5 illustrates a temporal transition from the conference display of the third device 510 at time A to an updated display of the third device 510 at time B. The conference display includes a grid 520 corresponding to participating users, and a primary display area 530. The grid 520 includes, in this example, five horizontal user regions to display the AV input corresponding to respective users participating in the conference session. In FIG. 5, illustrations of AV inputs other than the first AV input and the second AV input may be omitted for clarity of explanation.

In this example, as shown on the screen of the third device 510 at time A, the primary display area 430 displays a face of the first user 241 by rendering the first AV input from the first device 110 which captures the face of the first user 241 by using the sensing device 212. The grid 420 is not displaying a face of the second user 242, since the number of grids in this instance is less than the number of users participating in the conference session.

If the conference server 130 detects a designated user from the AV cue of the AV inputs including the first AV input and other AV inputs input by the other devices participating in the conference session, the conference server 430 pins the AV input from the device associated with the designated user to the grid 520. Third device 510 at time B in FIG. 5 illustrates that the second AV input is added to be displayed in the grid 420, in response to the detection of the designated user, the second user 242.

As shown on the screen of the third device 510 at time B, one of the user regions of grid 520 pins the user region of the second user 242 by displaying the second AV input from the second device 120, in response to the detection of the designated user, the second user 242. In this example, pinning the user region of the designated user at the grid includes displaying the AV input at the grid in a position visible to meeting participants for a predetermined period of time, until one or more different users are designated, or permanently unless other switching operations are performed.

The conference server 130 may detect the designated user from a designating user's AV cue by using various methods based on video input or audio input as described above with respect to FIG. 4.

In this way, the user experience is improved because an image corresponding to the person designated during the meeting can be made to appear on the screen for other meeting participants to see.

Figure 6:
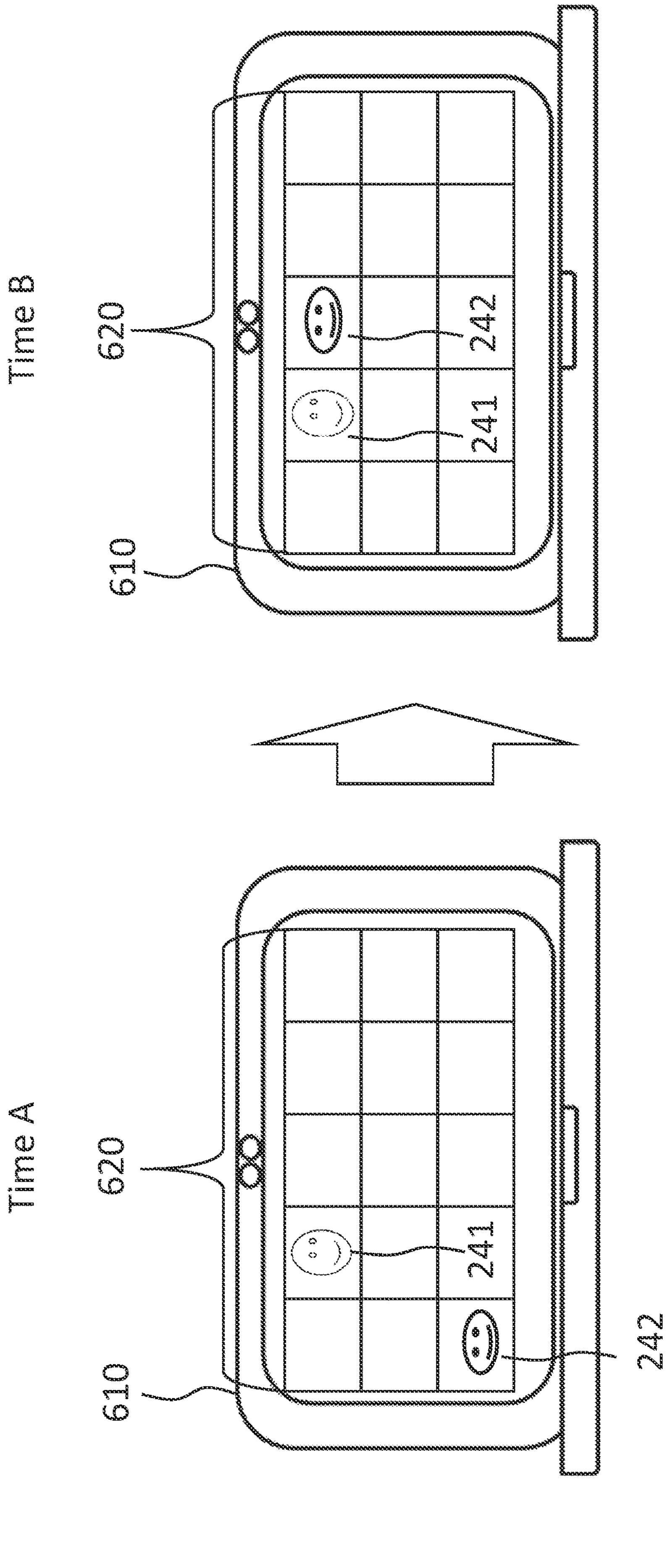
FIG. 6 illustrates an example of operation 308 of FIG. 3 in an embodiment of the present disclosure.

Modification of the Setting—Displaying the User Region Based on a Determined Direction FIG. 6 illustrates an example of operation 308 of FIG. 3 in an embodiment of the present disclosure. A third device 610 is participating in the same conference session with the first device 110 and the second device 120. FIG. 6 illustrates a temporal transition from the conference display of the third device 610 at time A to an updated display of the third device 610 at time B. The conference display includes a grid 620 corresponding to participating users. The grid 620 includes, in this example, fifteen user regions in which to display the AV input corresponding to respective users participating the conference session. In FIG. 6, illustrations of AV inputs other than the first AV input and the second AV input may be omitted for clarity of explanation.

In this example, as shown on the screen of the third device 610 at time A, the user regions corresponding to the first user 241 and the second user 242 are displayed in the grid 620.

If the conference server 130 detects a designated user from the AV cue of the AV inputs including the first AV input and other AV inputs input by the other devices participating in the conference session, the conference server 130 further identifies the designating user associated with the device that outputs the AV cue that was a source for detecting the designated user. For example, if the first user 241 shown in the third device 610 at time A designates the second user 242, the conference server identifies the first user 241 as the designating user, and the second user 242 as the designated user. The conference server 130 detects the designated user from AV cues by using various methods including based on video input and/or audio input as described above.

The conference server 130 further determines the direction from the designating user (e.g., the first user 241) to the designated user (e.g., the second user 241) by detecting the AV cue from the AV input(s). In some embodiments, the determination of the direction includes the determination of the line of sight of the designating user. For example, as shown in the screen of the third device 610 at time A, if the conference server 130 detects that the designating user (e.g., the first user 241) is looking to the right while designating the second user, the conference server 130 determines the direction of right as the direction from the designating user to the designated user.

In some embodiments, the determination of the direction includes a determination of the gesture of the designating user. For example, if the conference server 130 detects that the designating user (e.g., the first user 241) is performing a gesture of holding out their hand toward the right to designate the second user, the conference server 130 determines the direction of right as the direction from the designating user to the designated user.

As shown on the screen of the third device 610 at time B, the conference server 130 places the user region of the designated user (e.g., the second user 242) in the grid 620 at a display location relative to the user region of the designating user (e.g., the first user 241) in the same direction as the determined direction (e.g., right). The designated user does not need to be placed immediately next to the designated user, but only in a given spatial direction in terms of the designated user.

In this way, users can appear as if they are communicating with each other in the same virtual space, even if they are in different user regions, thus improving the user experience.

Operations of the Conference System—Participants Use the Same Devices

Figure 8:
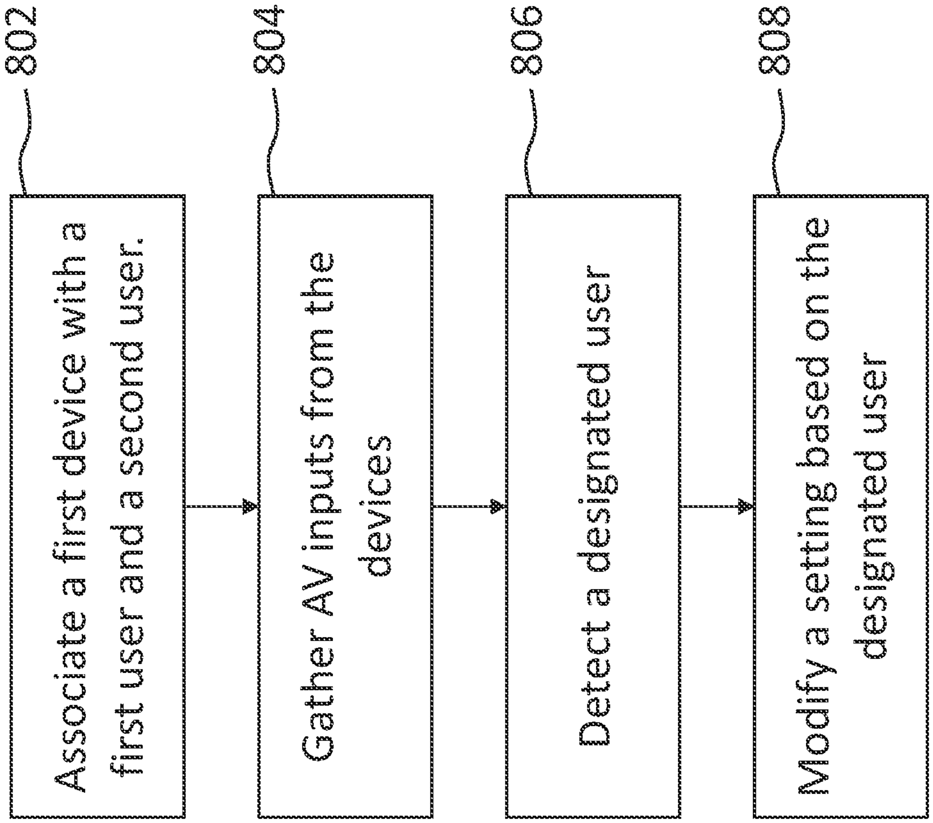
FIG. 8 illustrates a flowchart that describes an example of an overview operation of a conference system.

FIG. 8 illustrates an example of a flowchart that describes an overview operation of the conference system.

Here, behavior of the system when a user designates another user while logged in to a conference session using the same device is explained.

Figure 7:
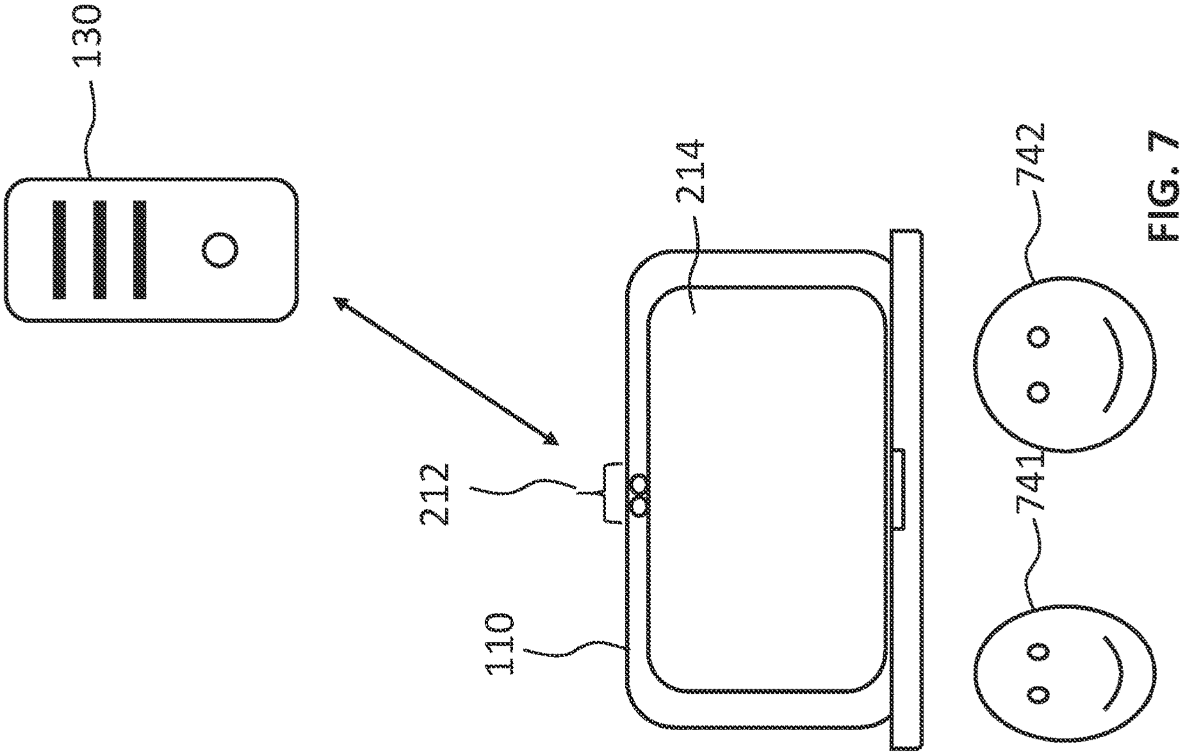
FIG. 7 illustrates an example of a conference system in an embodiment of the present disclosure.

FIG. 7 illustrates an example of a conference system in an embodiment of the present disclosure. A first user 741 and a user 742 use the same first device 120 at the conference session. Elements with the same labels as in FIG. 1 or FIG. 2 are substantially similar to the elements described in FIG. 1 or FIG. 2, and their descriptions are therefore omitted.

FIG. 8 illustrates a flowchart that describes an example of an overview operation of the conference system. In some embodiments, the operations described below are performed by functional elements of the conference server 130, such as the intake module 132, the detection engine 134, the video analyzer 136, and the audio analyzer 138, in cooperation with hardware elements such as a processor and memory. Henceforth, when the subject of the description of the operation is simply stated as the conference server 130, it means that one or more the above-mentioned elements performs the operation.

At operation 802, a first device is associated with both a first user and a second user. In an example, the conference server 130 associates the first device 110 with the first user 741 and the second user 742. The first user 741 and/or the second user 742 may attempt to participate in the conference session by using an invitation letter or holding a conference session. In some embodiments, the conference server 130 may perform the association by associating the user information entered by the first user 741 and/or the second user 742. In some embodiments, the conference server 130 may identify users participating in the conference session in the vicinity of the device from facial or audio input to the device, and associate the identified persons with the device. In some embodiments, in order to identify users in the vicinity of the device from the face or audio input, the conference server 130 may generate an AI model by machine learning to link user information with the user's face or voice based on the video or audio recordings of the conference sessions held and the input user information.

At operation 804, AV inputs are gathered from devices participating in the conference. In an example, the conference server 130 gathers the first AV input from the first device 110. In some embodiments, the conference server further gathers AV inputs from other devices participating in the conference session. In some embodiments, the conference server 130 gathers the AV inputs during an entire conference session or a specified time period designated by the users. In some embodiments, the conference server 130 stores the gathered AV inputs and uses them for the machine learning to create the AI models.

At operation 806, a designated user is detected. In an example, the conference server 130 detects a designated user by detecting AV cues from the AV inputs. The conference server 130 detects the designated user from an AV cue by using various methods based on video input and/or audio input as described above.

Figure 9:
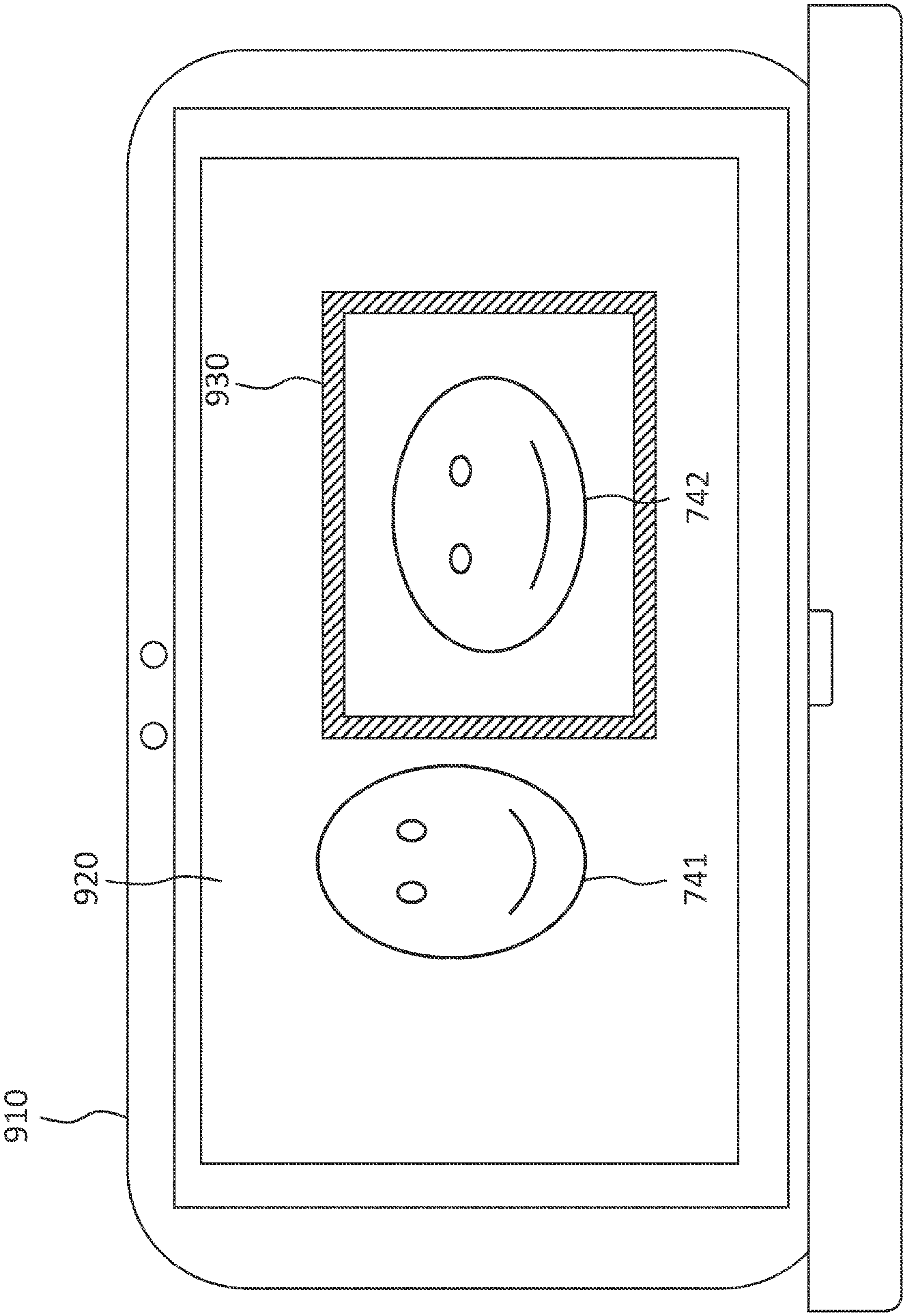
FIG. 9 illustrates an example of operation 808 of FIG. 8 in an embodiment of the present disclosure.

At operation 808, a conference setting is modified based on the designated user. In an example, the conference server 130 modifies a conference setting based on the designated user. FIG. 9 illustrates an example of operation 808 of FIG. 8 in an embodiment of the present disclosure. A third device 910 is participating in the same conference session as the first device 110. The conference display 920 displays the first AV input from the first device 110. If the conference server 130 detects that the first user 741 designates the second user 742, the conference server 130 modifies the conference display 920 by adding an indicator 930 to the designated user (e.g., the second user 742) to emphasize the designated user among the first user 741 and the second user 742. In some embodiments, the conference server 130 may detect that another user participating the conference session designates the second user 742, by detecting the AV cue from the AV inputs.

In some embodiments, the indicator 930 is a frame surrounding the designated user. In some embodiments, the indicator 930 is displayed for a predetermined period of time, until one or more different users are designated, or permanently unless other switching operations are performed.

In some embodiments, the conference server 130 may modify the settings to emphasize the designated user in other ways. For example, the conference server 130 may blur areas in the image other than the area showing the designated user, mute the audio of users other than the designated user, or increase the volume of the designated user's voice.

In some embodiments, the conference server 130 may use facial recognition techniques to recognize the area of the image showing the designated user from the video signal of the first AV input. In some embodiments, the conference server 130 may recognize the designated user's voice from the audio signal of the first AV input using speaker recognition techniques.

In this way, the user experience is improved because the presence of designated users can be emphasized even when multiple users are included on a single screen, for example, in the camera image of a dedicated conference terminal installed in a conference room.

Components of the System

Figure 10:
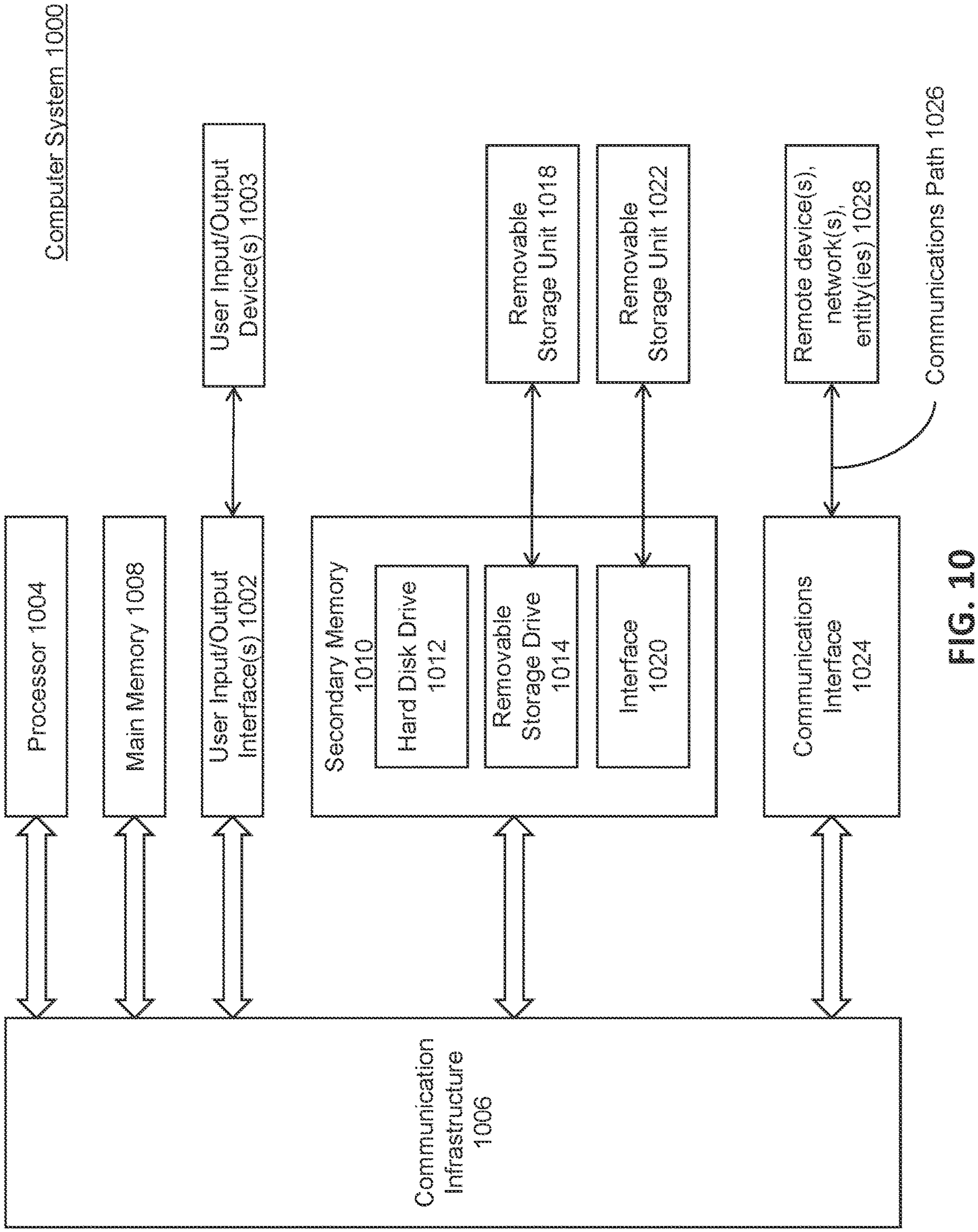
FIG. 10 illustrates an example architecture of components implementing a processor system in an embodiment of the present disclosure.

Various aspects of the above disclosure can be implemented, for example, using one or more processor systems, such as processor system 1000 shown in FIG. 10. Processor system 1000 can be any well-known computer capable of performing the functions described herein such as the first device 110, the second device 120, or the conference server 130 of FIG. 1. Processor system 1000 includes one or more processors (also called central processing units, or CPUs), such as a processor 1004. Processor 1004 is connected to a communication infrastructure 1006 (e.g., a bus.) Processor system 1000 also includes user input/output device(s) 1003, such as monitors, keyboards, pointing devices, etc., that communicate with communication infrastructure 1006 through user input/output interface(s) 1002. Processor system 1000 also includes a main or primary memory 1008, such as random access memory (RAM). Main memory 1008 may include one or more levels of cache. Main memory 1008 has stored therein control logic (e.g., computer software) and/or data.

Processor system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by processor system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Processor system 1000 may further include communication or network interface 1024. Communication interface 1024 enables processor system 1000 to communicate and interact with any combination of remote devices, remote networks, remote entities, etc. (individually and collectively referenced by reference number 1028). For example, communication interface 1024 may allow processor system 1000 to communicate with remote devices 1028 over communications path 1026, which may be wired and/or wireless, and may include any combination of LANs, WANs, the Internet, etc. Control logic and/or data may be transmitted to and from processor system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, processor system 1000, main memory 1008, secondary memory 1010 and removable storage units 1018 and 1022, as well as tangible articles of manufacture embodying any combination of the foregoing. Such control logic, when executed by one or more data processing devices (such as processor system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:

associating, by a conference system, a first device of a plurality of devices participating in a conference session with a first user of a plurality of users participating in the conference session;

gathering, by the conference system, an audio/video input from a second device of the plurality of devices;

analyzing, by the conference system, a video signal of the audio/video input;

detecting, by the conference system, a gesture directed at a third user;

identifying, by the conference system, the third user is a potential designated user based on the detected gesture being directed at the third user;

parsing, by the conference system, a voice signal of the audio/video input;

detecting, by the conference system, an identifier in the voice signal based on the parsing;

determining, by the conference system, the first user is a designated user from the plurality of users based on the detected identifier in the voice signal being associated with the first user, wherein the detected identifier in the voice signal overrides the identified third user being a potential designated user; and modifying, by the conference system, a setting of the conference session based on the designated user.

2. The computer-implemented method of claim 1, wherein:

the associating comprises associating multiple of the plurality of devices participating in the conference session with respective users participating in the conference session; and the modifying comprises modifying a display method of the video input of the first device associated with the designated user.

3. The computer implemented method of claim 2, further comprising:

identifying a primary user from among the respective users; and detecting a change of the primary user to the designated user based on the detected identifier in the voice signal being associated with the first user; and wherein modifying the display method of the video input of the first device associated with the designated user comprises setting the video input of the first device associated with the designated user as a primary video of the conference session.

4. The computer implemented method of claim 2, further comprising:

displaying a plurality of user regions in a grid corresponding to the respective users as a screen of the conference system; and wherein:

modifying the display method of the video input of the first device associated with the designated user comprises modifying the display method of the user region of the designated user in the grid.

5. The computer implemented method of claim 4, wherein:

modifying the display method of the user region of the designated user in the grid comprises pinning the user region of the designated user at a specific area of the grid for at least a predetermined period of time.

6. The computer implemented method of claim 4, further comprising:

identifying a second user as a designating user, associated with the second device that output the voice signal that was a source for detecting the designated user; and determining a direction from the designating user to the designated user based on the detecting the identifier in the voice signal; and wherein:

modifying the display method of the user region of the designated user in the grid comprises placing the user region of the designated user at a display location relative to the user region of the designating user in a same direction as the determined direction.

7. The computer-implemented method of claim 1, wherein:

the associating comprises associating the first device of the plurality of devices participating in the conference session with multiple of the plurality of users participating in the conference session; and the modifying comprises emphasizing the designated user among the plurality of the users in the video input of the first device associated with the designated user.

8. The computer-implemented method of claim 1, further comprising:

detecting a gesture in the video input that designates at least one of the plurality of users.

9. The computer-implemented method of claim 1, further comprising:

detecting a voice in the audio input that designates at least one of the plurality of users.

10. A conference system, comprising:

a memory; and at least one processor coupled to the memory and configured to:

associate a first device of a plurality of devices participating in a conference session with a first user of a plurality of users participating in the conference session;

gather an audio/video input from a second device of the plurality of devices;

analyze a video signal of the audio/video input;

detect a gesture directed at a third user;

identify the third user is a potential designated user based on the detected gesture being directed at the third user;

parse a voice signal of the audio/video input;

detect an identifier in the voice signal based on the parsing;

determine the first user is a designated user from the plurality of users based on the detected identifier in the voice signal being associated with the first user, wherein the detected identifier in the voice signal overrides the identified third user being a potential designated user; and modify a setting of the conference session based on the designated user.

11. The conference system of claim 10, wherein to associate, the at least one processor is further configured to:

associate multiple of the plurality of devices participating in the conference session with respective users participating in the conference session; and wherein to modify, the at least one processor is further configured to modify a display method of the video input of the first device associated with the designated user.

12. The conference system of claim 11, the at least one processor further configured to:

identify a primary user from among the respective users; and detect a change of the primary user to the designated user based on the detected identifier in the voice signal being associated with the first user; and wherein to modify the display method of the video input of the first device associated with the designated user, the at least one processor is further configured to set the video input of the first device associated with the designated user as a primary video of the conference session.

13. The conference system of claim 11, the at least one processor further configured to:

display a plurality of user regions in a grid corresponding to the respective users as a screen of the conference system; and wherein to modify the display method of the video input of the first device associated with the designated user, the at least one processor is further configured to modify the display method of the user region of the designated user in the grid.

14. The conference system of claim 13, wherein to modify the display method of the user region of the designated user in the grid, the at least one processor is further configured to:

pin the user region of the designated user at a specific area of the grid for at least a predetermined period of time.

15. The conference system of claim 13, the at least one processor further configured to:

identify a second user as a designating user, associated with the second device that output the voice signal that was a source for detecting the designated user; and determine a direction from the designating user to the designated user based on the detecting the identifier in the voice signal; and wherein to modify the display method of the user region of the designated user in the grid, the at least one processor is further configured to place the user region of the designated user at a display location relative to the user region of the designating user in a same direction as the determined direction.

16. The conference system of claim 10, wherein:

to associate, the at least one processor is further configured to associate the first device of the plurality of devices participating in the conference session with multiple of the plurality of users participating in the conference session; and wherein to modify, the at least one processor is further configured to emphasize the designated user among the plurality of the users in the video input of the first device associated with the designated user.

17. The conference system of claim 10, the at least one processor further configured to:

detect a gesture in the video input that designates at least one of the plurality of users.

18. The conference system of claim 10, the at least one processor further configured to:

detect a voice in the audio input that designates at least one of the plurality of users.

19. A computer readable storage device having instructions stored thereon that, when executed by one or more processing devices, cause the one or more processing devices to perform operations comprising:

associating, by a conference system, a first device of a plurality of devices participating in a conference session with a first user of a plurality of users participating in the conference session;

gathering, by the conference system, an audio/video input from a second device of the plurality of devices;

analyzing, by the conference system, a video signal of the audio/video input;

detecting, by the conference system, a gesture directed at a third user;

identifying, by the conference system, the third user is a potential designated user based on the detected gesture being directed at the third user;

parsing, by the conference system, a voice signal of the audio/video input;

detecting, by the conference system, an identifier in the voice signal based on the parsing;

determining, by the conference system, the first user is a designated user from the plurality of users based on the detected identifier in the voice signal being associated with the first user, wherein the detected identifier in the voice signal overrides the identified third user being a potential designated user; and modifying, by the conference system, a setting of the conference session based on the designated user.

20. The computer readable storage device of claim 19, wherein:

the associating comprises associating multiple of the plurality of devices participating in the conference session with respective users participating in the conference session; and the modifying comprises modifying a display method of the video input of the first device associated with the designated user.

* * * * *